United States Patent
Kasai et al.

(10) Patent No.: US 9,102,013 B2
(45) Date of Patent: Aug. 11, 2015

(54) FLUX-CORED WELDING WIRE FOR CARBON STEEL AND PROCESS FOR ARC WELDING

(71) Applicant: Kobe Steel, Ltd., Kobe-shi (JP)

(72) Inventors: Ryu Kasai, Fujisawa (JP); Reiichi Suzuki, Fujisawa (JP)

(73) Assignee: Kobe Steel, Inc., Kobe-shi (JP)

( * ) Notice: Subject to any disclaimer, the term of this patent is extended or adjusted under 35 U.S.C. 154(b) by 248 days.

(21) Appl. No.: 13/693,331

(22) Filed: Dec. 4, 2012

(65) Prior Publication Data

US 2013/0161303 A1  Jun. 27, 2013

(30) Foreign Application Priority Data

Dec. 27, 2011  (JP) ................................ 2011-286830

(51) Int. Cl.
  *B23K 35/22* (2006.01)
  *B23K 9/23* (2006.01)
  *B23K 35/362* (2006.01)
  (Continued)

(52) U.S. Cl.
  CPC . *B23K 35/22* (2013.01); *B23K 9/23* (2013.01); *B23K 35/0266* (2013.01); *B23K 35/362* (2013.01); *B23K 35/368* (2013.01); *B23K 35/383* (2013.01); *C22C 38/02* (2013.01); *C22C 38/04* (2013.01)

(58) Field of Classification Search
  CPC ........... B23K 35/0261; B23K 35/0266; B23K 35/22; B23K 35/3026

USPC .............. 219/137 WM, 137.2, 145.1, 145.22, 219/146.1, 146.22
  See application file for complete search history.

(56) References Cited

U.S. PATENT DOCUMENTS

2008/0142490 A1   6/2008  Suzuki et al.
2009/0261085 A1*  10/2009 Suzuki et al. ........... 219/137 PS
(Continued)

FOREIGN PATENT DOCUMENTS

EP   2 377 637 A1   10/2011
JP   5-305476        11/1993
(Continued)

OTHER PUBLICATIONS

Machine Translation (Oct. 31, 2013) JP11-320178 Nov. 24, 1999.*
(Continued)

*Primary Examiner* — Brian Jenniser
(74) *Attorney, Agent, or Firm* — Oblon, McClelland, Maier & Neustadt, L.L.P.

(57) ABSTRACT

Arc welding is performed with a flux-cored welding wire using pure Ar shielding gas with a pulsed current having a peak current of 340 to 540 A and a peak current time of 0.7 to 2.5 ms as a welding current, in which the wire includes a carbon-steel sheath and contains, on a mass percent basis, 0.02% to 0.15% C, 0.30% to 1.50% Si, 0.70% to 2.30% Mn, 0.010% to 0.100% S, 0.01% to 0.18% Ti, 0.030% or less P, and 0.15% or less Cr, with respect to the total mass of the wire, in which the wire has a flux content of 10.0% to 30.0%, the flux has a S content of 0.030% to 0.600%, and the wire satisfies $[S_f] > ([S_h] + 0.010)$, where $[S_f]$ represents the S content (%) of the flux, and $[S_h]$ represents the S content (%) of the sheath.

14 Claims, 2 Drawing Sheets

(51) Int. Cl.
*B23K 35/368* (2006.01)
*B23K 35/38* (2006.01)
*B23K 35/02* (2006.01)
*C22C 38/02* (2006.01)
*C22C 38/04* (2006.01)

(56) References Cited

U.S. PATENT DOCUMENTS

2011/0114606 A1* 5/2011 Suzuki .......................... 219/74
2011/0253679 A1 10/2011 Yamazaki et al.

FOREIGN PATENT DOCUMENTS

| | | |
|---|---|---|
| JP | 11-320178 A | 11/1999 |
| JP | 2006-272405 A | 10/2006 |
| JP | 2009-255125 A | 11/2009 |

OTHER PUBLICATIONS

Extended European Search Report issued on Apr. 17, 2013 in the corresponding European Application No. 12198979.2.

* cited by examiner

FLUX-CORED WELDING WIRE FOR CARBON STEEL AND PROCESS FOR ARC WELDING

BACKGROUND OF THE INVENTION

1. Field of the Invention

The present invention relates to a flux-cored welding wire for carbon steel and a process for arc welding using the flux-cored welding wire, and more specifically, to a flux-cored welding wire used for arc welding using pure argon gas as a shielding gas and a process for arc welding of carbon steel using the flux-cored welding wire.

2. Description of the Related Art

An oxidizing gas, such as $CO_2$, or a mixed gas of argon (Ar) and an oxidizing gas has been commonly used as a shielding gas for arc welding of carbon steel. However, in the case where welding is performed with such a shielding gas, the oxidizing gas in the shielding gas reacts with elements, such as Si and Mn, contained in a steel sheet or a wire to generate many slag components on a bead surface, disadvantageously resulting in a significant degradation of bead appearance. In traditional metal active gas (MAG) welding using $CO_2$ as a shielding gas, a welding wire having a specific ratio (Si/Mn) of the amount of Si and the amount of Mn is reported in order to suppress the amount of slag generated (see Japanese Unexamined Patent Application Publication No. 11-320178).

In the case where slag is generated on a bead surface, when a welded joint is coated, a coating material does not adhere to only a slag portion, or the resulting coating film is peeled by the detachment of slag. As a result, while coating treatment is performed, corrosion may be promoted from a peeled portion. This problem is particularly liable to occur when a coating process, such as electrodeposition coating, which requires electrical conductivity, is performed. As a technique for improving coatability on a bead surface, for example, a metal-based-flux-cored welding wire in which graphite is added to a flux to reduce the amount of slag is reported (see Japanese Unexamined Patent Application Publication No. 2006-272405).

The use of pure Ar gas as a shielding gas without using an oxidizing gas suppresses the generation of slag. However, welding of carbon steel using pure Ar gas has been thought to be substantially impossible. The reason for this is as follows: A solid wire used for arc welding of carbon steel does not provide a thermal pinch force associated with the dissociation of an active gas in the shielding gas. A droplet is elongated and swung by, for example, an electromagnetic force. Thus, rotating transfer is liable to occur, failing to form a normal bead.

In a welding process, such as tungsten inert gas (TIG) welding, with a non-consumable electrode, it is possible to perform welding of carbon steel using pure Ar gas. In such a welding process, however, heat from electrical resistance of a wire is not generated. Compared with MAG welding or metal inert gas (MIG) welding with a wire serving as an electrode, a wire melting speed is low, so a welding speed is inevitably low, thus significantly reducing productivity. A MIG arc welding process using pure Ar shielding gas is reported (see Japanese Unexamined Patent Application Publication No. 2009-255125). In the welding process described in Japanese Unexamined Patent Application Publication No. 2009-255125, the incorporation of specific amounts of graphite and an iron powder into a flux enables welding in pure Ar gas, thereby suppressing the generation of slag and fumes.

SUMMARY OF THE INVENTION

However, in the techniques described above, good bead appearance is not provided. Specifically, the technique described in Japanese Unexamined Patent Application Publication No. 11-320178 is MAG welding using an oxidizing gas. The generation of slag is not eliminated. The generated slag components aggregate and dotted on bead surface, so bead appearance is not improved. The welding wire described in Japanese Unexamined Patent Application Publication No. 11-320178 is a solid wire. As described above, it is difficult to perform welding in pure Ar gas because of rotating transfer.

In the welding process described in Japanese Unexamined Patent Application Publication No. 2006-272405, a flux-cored welding wire is used. This technique just suppresses the amount of slag to a level comparable to that when a solid wire is used. The generation of slag cannot be avoided. The flux-cored welding wire described in Japanese Unexamined Patent Application Publication No. 2006-272405 has a high C content and causes the strength of a joint to be excessively high, so the wire is not suitable for common carbon steel.

In the technique described in Japanese Unexamined Patent Application Publication No. 2009-255125, it is possible to suppress the generation of slag. However, oxide films derived from, for example, oxide on a surface of a steel sheet are often formed and scattered on a bead surface, which is a problem with appearance. The flux-cored welding wire described in Japanese Unexamined Patent Application Publication No. 2009-255125 contains a large amount of graphite. A welded metal portion has high strength and is suitable for a 780 MPa or more grade high-tensile steel sheet. However, the welded metal portion is not suitable for common carbon steel (mild steel to 590 MPa grade) because of its excessively high strength.

It is a main object of the present invention to provide a flux-cored welding wire for arc welding of carbon steel, the wire providing excellent bead appearance, and a process for arc welding.

To overcome the foregoing problems, the inventors have conducted intensive studies and have found the following: To perform welding using pure Ar shielding gas, it is necessary to use a flux-cored welding wire rather than a solid wire because of a droplet transfer mode. In the technique described in Japanese Unexamined Patent Application Publication No. 2009-255125, graphite, which is stable at high temperatures, is used as an arcing source. In the case where mild steel, such as carbon steel, is welded, a welded portion has excessively high strength, so graphite is not used.

Accordingly, the inventors have conducted studies on a method for eliminating excessively high strength of a welded portion and stabilizing an arc. Specifically, the inventors have conducted studies on a material that changes melting points of a sheath and a flux and that allows the sheath and the flux to have different timings of melting, and have found that the addition of a specific amount of S in place of graphite allows the sheath and the flux to have different timings of melting. That is, S is not uniformly added to the entire wire but is added to the flux alone in such a manner that the flux and the sheath have different S contents. S is a low melting point. Thus, this structure enables the flux to be melted before the sheath.

S is an element that causes hot cracking. Commonly, S is not intentionally added. However, the addition of an amount of S that is less likely to cause cracking stabilizes droplets without significantly changing joint strength. It was also found that S has the effect of changing convection of a molten pool and forms a flow in a surface layer in the direction opposite to a normal flow to collect oxide films at a crater. On the basis of these findings, the inventors have found that MIG welding of even mild steel, such as carbon steel, can be performed with pure Ar gas using a flux-cored welding wire containing a controlled amount of S added and wire components that fall within specific ranges, unlike TIG welding, which has low working efficiency. This finding has led to the completion of the present invention.

According to the present invention, a flux-cored welding wire for carbon steel, the flux-cored welding wire including a carbon-steel sheath filled with a flux, the flux-cored welding wire includes 0.02% to 0.15% by mass C, 0.30% to 1.50% by mass Si, 0.70% to 2.30% by mass Mn, 0.010% to 0.100% by mass S, 0.01% to 0.18% by mass Ti, 0.030% by mass or less P, and 0.15% by mass or less Cr, with respect to the total mass of the wire, in which the flux-cored welding wire has a flux content of 10.0% to 30.0% by mass, the flux has a S content of 0.030% to 0.600% by mass, the flux-cored welding wire satisfies $[S_f] > ([S_h] + 0.010)$, where $[S_f]$ represents the S content (% by mass) of the flux, and $[S_h]$ represents the S content (% by mass) of the sheath, and the flux-cored welding wire is used for arc welding using pure Ar as a shielding gas. In the present invention, wire components fall within specific ranges, thus reducing the viscosity and the surface tension of a molten pool and generating convection (in an arc-following direction) in a surface layer of the molten pool in the direction opposite to a direction of normal convection. This provides the effect of collecting oxide films floating on the surface of the molten pool at the crater portion, thereby improving bead appearance. In the flux-cored welding wire, the flux may have a S content of 0.060% to 0.350% by mass.

According to the present invention, a process for arc welding of carbon steel includes performing arc welding of carbon steel with a flux-cored welding wire using pure Ar gas serving as a shielding gas with a pulsed current having a peak current of 340 to 540 A and a peak current time of 0.7 to 2.5 ms (milliseconds), the pulsed current serving as a welding current, in which the flux-cored welding wire includes a sheath composed of carbon steel, and a flux, and the flux-cored welding wire contains 0.02% to 0.15% by mass C, 0.30% to 1.50% by mass Si, 0.70% to 2.30% by mass Mn, 0.010% to 0.100% by mass S, 0.01% to 0.18% by mass Ti, 0.030% by mass or less P, and 0.15% by mass or less Cr, with respect to the total mass of the wire, in which the flux-cored welding wire has a flux content of 10.0% to 30.0% by mass, the flux has a S content of 0.030% to 0.600% by mass, and the flux-cored welding wire satisfies $[S_f] > ([S_h] + 0.010)$, where $[S_f]$ represents the S content (% by mass) of the flux, and $[S_h]$ represents the S content (% by mass) of the sheath. In the present invention, the shielding gas is pure Ar gas, thereby inhibiting the generation of slag. The flux to which S is added is used. Thus, oxide films on a bead surface are localized at a crater portion, thereby improving bead appearance. A combination of the flux-cored welding wire and pure Ar shielding gas enables stable welding without adding graphite to the flux. In the case where welding is performed with a pulsed current, the amount of spatters is reduced, compared with solid wires in the related art, thereby improving a working environment.

According to the present invention, the flux-cored welding wire having a specific composition is used. Thus, even when arc welding of carbon steel is performed with pure Ar shielding gas, excellent bead appearance can be made.

BRIEF DESCRIPTION OF THE DRAWINGS

FIG. 1A illustrates a defective bead appearance, and FIG. 1B illustrates good bead appearance.

DESCRIPTION OF THE PREFERRED EMBODIMENTS

Figure 1A:
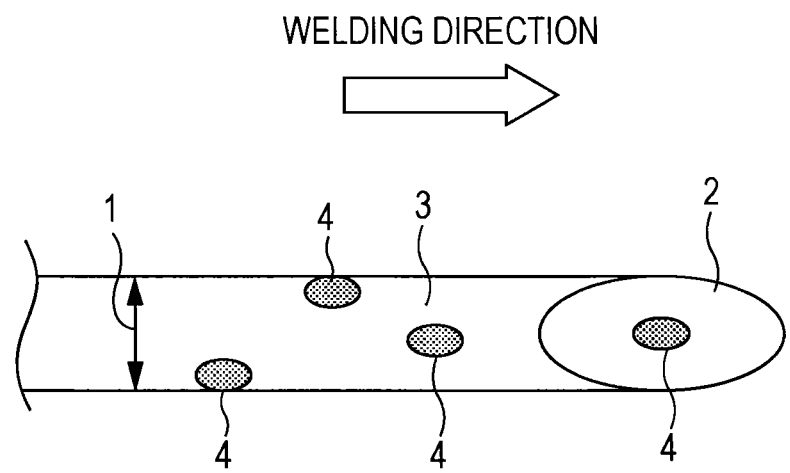
FIGS. 1A and 1B illustrate evaluation criteria of a bead appearance.

While embodiments of the present invention will be described in detail below, the present invention is not limited to the embodiments described below.

First Embodiment

A flux-cored welding wire according to a first embodiment of the present invention will be described below. The flux-cored welding wire according to this embodiment is used for arc welding using pure Ar as a shielding gas and has a structure in which a flux is filled into a carbon-steel sheath. In the flux-cored welding wire according to the embodiment, the whole of the wire including the sheath and the flux contains specific amounts of C, Si, Mn, S, and Ti, and the P content and the Cr content are limited to specific amounts or less.

The flux-cored welding wire according to the embodiment has a flux content of 10.0% to 30.0% by mass, the flux having a S content of 0.030% to 0.600% by mass, in which the flux-cored welding wire satisfies formula (1) described below:

$$[S_f] > ([S_h] + 0.010) \quad \text{formula (1)}$$

where $[S_f]$ represents the S content (% by mass) of the flux, and $[S_h]$ represents the S content (% by mass) of the sheath.

C: 0.02% to 0.15% by mass

C affects the strength of a weld metal and thus needs to be contained in a certain amount suitable for common carbon steel. Specifically, at a C content of less than 0.02% by mass with respect to the total mass of the wire, sufficient strength cannot be ensured. A C content exceeding 0.15% by mass often causes spatters even if pure Ar gas is used as a shielding gas. Accordingly, the C content is in the range of 0.02% to 0.15% by mass with respect to the total mass of the wire. In the flux-cored welding wire according to the embodiment, there is no need to intentionally add a C source. It is possible to achieve the foregoing range by adjusting the amount of C in a steel plate constituting the sheath and the amount of C in the flux composed of ferrosilicon, ferromanganese, or the like.

Si: 0.30% to 1.50% by mass

The flux-cored welding wire according to the embodiment is used for arc welding using a pure Ar shielding gas. Thus, there is no need to add Si serving as a deoxidizer. To ensure the strength suitable for carbon steel and improve the conformity of bead toes, however, Si needs to be added to some extent. Specifically, at a Si content of less than 0.30% by mass with respect to the total mass of the wire, the effect of improving the conformity of the bead toes is not provided. A Si content exceeding 1.50% by mass results in excessively high hardness of a welded portion, thereby impairing soundness.

Accordingly, the Si content is in the range of 0.30% to 1.50% by mass with respect to total mass of the wire. The Si content is preferably 0.50% by mass or more from the viewpoint of achieving a good balance with a base metal. To suppress an increase in the viscosity of a molten pool and stably provide the effect of aggregating oxide films by the addition of S described below, the Si content is preferably 1.20% by mass or less.

Mn: 0.70% to 2.30% by mass

The flux-cored welding wire according to the embodiment is used for arc welding using pure Ar shielding gas. Thus, there is no need to add Mn serving as a deoxidizer. To ensure the strength, however, Mn is added. At a Mn content of less than 0.70% by mass with respect to the total mass of the wire, a weld metal becomes brittle, thereby impairing the soundness of the welded portion. A Mn content exceeding 2.30% by mass results in excessively high viscosity, thereby reducing the effect of the addition of S described below.

Accordingly, the Mn content is in the range of 0.70% to 2.30% by mass with respect to the total mass of the wire. The Mn content is preferably 1.00% by mass or more, thereby improving a bead shape. A Mn content exceeding 2.10% by mass may result in the reaction of Mn and S to form a sulfide, thereby reducing the effect of the addition of S. Thus, the Mn content is preferably 2.10% by mass or less.

S: 0.010% to 0.100% by mass

S is an important element in the flux-cored welding wire according to the embodiment. Specifically, S has the following effect: S reduces the viscosity and the surface tension of a molten pool, changes the convection of the molten pool to form an arc-following forward flow in a surface layer, and collects oxide films formed on a surface at a crater portion. At a S content of less than 0.010% by mass with respect to the total mass of the wire, this effect is not provided. An excessively high S content, specifically, a S content exceeding 0.100% by mass, increases the risk of hot cracking, thereby failing to prevent hot cracking even if other elements are adjusted.

Accordingly, the S content is in the range of 0.010% to 0.100% by mass with respect to the total mass of the wire. The S content is preferably in the range of 0.015% to 0.060% by mass with respect to the total mass of the wire. In this case, the foregoing effect is sufficiently provided while inhibiting the occurrence of hot cracking.

S is a low-melting-point element. Thus, S is generally added to the flux to reduce the melting point of the flux and allows the flux and the sheath to have different timings of melting. As a result, a cross section of the wire is melted stepwise. It is thus possible to prevent the occurrence of unstable streaming transfer that exhibits an excessively long droplet and stably perform welding even in pure Ar shielding gas.

In the flux-cored welding wire according to the embodiment, the S content of the flux is also specified in addition to the S content of the whole of the wire. Specifically, the S content of the flux is in the range of 0.030% to 0.600% by mass. At a S content of the flux of less than 0.030% by mass, the effect of changing the convection of the molten pool is weak, so the effect of collecting the oxide films to the crater portion is insufficient. Thus, the oxide films are left on a steady portion to degrade the bead appearance. A S content of the flux of more than 0.600% by mass may cause hot cracking. The S content of the flux is preferably in the range of 0.060% to 0.350% by mass. In this case, the effect of changing the convection is provided while the risk of hot cracking is reduced.

To melt the flux before the sheath is melted, the S content of the flux needs to be sufficiently higher than the S content of the sheath. In the flux-cored welding wire according to the embodiment, the relationship between the S content of the flux, i.e., $[S_f]$ (% by mass), and the S content of the sheath, i.e., $[S_h]$ (% by mass), satisfies formula (1).

Ti: 0.01% to 0.18% by mass

Ti has the effect of increasing the surface tension and the viscosity. The addition of a specific amount of Ti reduces the wiggling of droplets and stabilizes an arc. Specifically, a Ti content of less than 0.01% by mass with respect to the total mass of the wire does not result in the effect. An excessively high Ti content exceeding 0.18% by mass causes cracking to occur and, in contrast, causes the arc to be unstable. Accordingly, the Ti content is in the range of 0.01% to 0.18% by mass with respect to the total mass of the wire. The Ti content is preferably in the range of 0.02% to 0.09% by mass. In this case, the stability of the arc can be further improved.

P: 0.030% by mass or less

P reduces resistance to hot cracking and thus is preferably minimized. P need not be intentionally added. Accordingly, in the flux-cored welding wire according to the embodiment, the P content is limited to 0.030% by mass or less with respect to the total mass of the wire in view of industrial productivity.

Cr: 0.15% by mass or less

As with Ti, Cr has the effect of increasing the surface tension and the viscosity. If the wire contains Cr, the effect of S added may be reduced. Thus, Cr need not be intentionally added. In the flux-cored welding wire according to the embodiment, the Cr content is limited to 0.15% by mass or less with respect to the total mass of the wire.

Balance

In the composition of the flux-cored welding wire according to the embodiment, the balance is Fe and incidental impurities. The flux-cored welding wire according to the embodiment may contain, for example, a deoxidizer and a fluoride, which are contained in a usual flux-cored welding wire, in addition to the foregoing components.

Flux content: 10.0% to 30.0% by mass

If the flux content does not fall within a specific range, the foregoing mechanism, in which different timings of melting of the flux and the sheath result in stable transfer of droplets, does not work appropriately. This leads to an unstable arc and an increase in the amount of spatters. Specifically, at a flux content of less than 10.0% by mass, the cross-sectional area of the sheath accounts for a large proportion of the cross-sectional area of the wire. A large amount of the sheath melted subsequent to the melting of the flux increases the size of droplets and the amount of spatters. A flux content exceeding 30.0% by mass results in a small cross-sectional area of the sheath. Thus, the sheath has high electrical resistance and is easily melted. As a result, the effect of allowing the flux and the sheath to have different timings of melting is weakened, thus causing droplet transfer to be unstable. Hence, the flux content is in the range of 10.0% to 30.0% by mass.

Conditions, such as the cross-sectional shape of the wire and the diameter of the wire, of the flux-cored welding wire according to the embodiment are not particularly limited and may be appropriately selected, depending on applications, welding conditions, and so forth.

As described above in detail, in the flux-cored welding wire according to the embodiment, the wire components fall within the ranges described above. MIG welding can be performed with pure Ar gas while operating efficiency is not reduced, unlike TIG welding. Furthermore, pure Ar gas is used as a shielding gas, thereby inhibiting the formation of slag.

In the flux-cored welding wire according to the embodiment, a specific amount of S is added to the flux. It is thus possible to inhibit the flow of the molten pool due to an arc force, which is relatively large in traditional welding processes. It is also possible to change the direction of convection due to nonuniformity in temperature balance and collect oxide films formed on a bead surface at the crater portion. As a result, the appearance of the steady portion of the bead is significantly improved. There has never been such a technique for aggregating the oxide films at the crater portion in order to improve the bead appearance.

S is a low-melting-point material. The addition of S to the flux results in different timings of melting of the flux and the sheath of the flux-cored welding wire according to the embodiment, so that the flux and sheath are melted stepwise. This eliminates the occurrence of unstable streaming transfer due to simultaneous melting. Unlike the foregoing technique disclosed in Japanese Unexamined Patent Application Publication No. 2009-255125, welding can be stably performed without adding graphite to the flux.

Second Embodiment

A process for arc welding according to a second embodiment of the present invention will be described below. In the process for arc welding according to this embodiment, the foregoing flux-cored welding wire according to the first embodiment is used, and arc welding of carbon steel is performed using pure Ar shielding gas. In this case, a pulsed current having a peak current of 340 to 540 A and a peak-current time of 0.7 to 2.5 ms (milliseconds) is used as a welding current.

Here, the reason the pulsed current is used as a welding current is that workability and bead appearance are improved, in other words, the amount of spatters are reduced. In the case where the peak current is less than 340 A, however, the detachment of droplets during the peak time is not completed. Thus, the subsequent peak time starts during falling to increase the amount of spatters. A peak current exceeding 540 A results in excessively large droplets, thereby increasing the amount of spatters. In the case where the peak-current time is less than 0.7 ms, the peak time ends before detachment. The subsequent peak time starts during falling, thereby increasing the amount of spatters. At a peak-current time exceeding 2.5 ms, the peak time is continued even after detachment, thereby increasing the amount of spatters. Accordingly, the peak current of the pulse is in the range of 340 to 540 A, and the peak-current time of the pulse is in the range of 0.7 to 2.5 ms.

In the process for arc welding according to the embodiment, pure Ar gas is used as a shielding gas, thereby inhibiting the formation of slag. The foregoing flux-cored welding wire according to the first embodiment is used in addition to the pure Ar shielding gas. Thus, welding can be stably performed without adding graphite to the flux. Furthermore, in the flux-cored welding wire according to the first embodiment, S is added to the flux. Thus, the oxide films on the bead surface are collected at the crater portion to provide good bead appearance.

EXAMPLES

The advantageous effects of the present invention will be specifically described below by examples and Comparative Examples of the present invention.

First Example

In a first example corresponding to the first embodiment of the present invention, arc welding of carbon steel was performed using different wire compositions and different shielding gases. The bead appearance and the amount of spatters were evaluated. In this case, before use of base metals, black scale on carbon steel SS400 was removed by a grinder. Welding was performed under conditions as follows: bead-on, wire extension (Ext): 15 mm, welding speed: 60 cm/min, wire supply speed: 10 m/min, and gas flow rate: 25 L/min.

The welding current and welding voltage were set as follows: pure Ar shielding gas+flux-cored welding wire: 260 A-23 V; pure Ar shielding gas+solid wire: 280 A-23 V; Ar/$CO_2$ mixed shielding gas+flux-cored welding wire: 280 A-28 V; and Ar/$CO_2$ mixed shielding gas+solid wire: 290 A-28 V. The welding current was a pulsed current with a peak current of 450 A and a peak time of 1.2 ms.

Evaluation

Figure 1B:
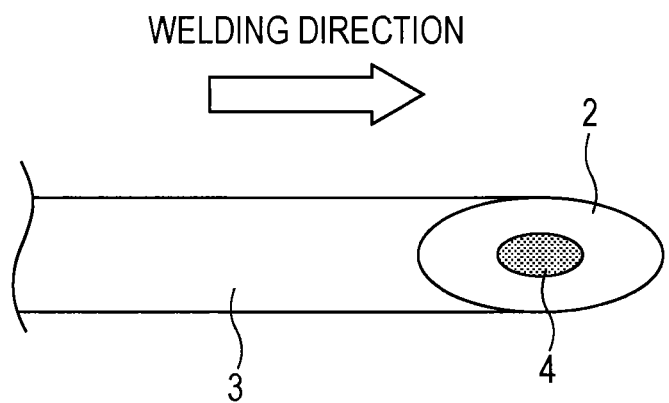

FIGS. 1A and 1B illustrate evaluation criteria of a bead appearance. The evaluation criteria of the bead appearance are as follows:

F: Three or more oxide films 4 or slag components are dotted on a steady portion (metal texture 3) of a weld bead 1 as illustrated in FIG. 1A, P: None of the oxide films 4 or the slag components are present, or the oxide films 4 or the slag components are localized at an end as illustrated in FIG. 1B.

The oxide films 4 at a crater portion 2 are excluded because they do not affect the bead appearance.

The evaluation criteria of the amount of spatters are as follows:

P: 0.6 g/min or less,

F: more than 0.6 g/min.

Note that in the case where arc welding is performed with the flux-cored welding wire produced within the range of the present invention using pure Ar shielding gas without using a pulsed current, the amount of spatters is in the range of about 0.7 to about 0.8 g/min. Tables 1 to 4 summarize the results. The "EVALUATION OF S CONTENT" described in Tables 1 to 4 is an evaluation as to whether the relationship between the S content of the flux [$S_f$] and the S content of the sheath [$S_h$] satisfies formula (1) or not.

TABLE 1

| | WIRE No. | WIRE TYPE | SHIELDING GAS | WIRE COMPOSITION (% by mass) | | | | | | | | |
|---|---|---|---|---|---|---|---|---|---|---|---|---|
| | | | | C | Si | Mn | P | S | [$S_h$] | [$S_f$] | Cr | Ti |
| EXAMPLE 1 | 1 | FCW | Ar | 0.02 | 0.89 | 1.80 | 0.008 | 0.031 | 0.005 | (0.173) | 0.020 | 0.03 |
| EXAMPLE 2 | 2 | FCW | Ar | 0.03 | 0.91 | 1.79 | 0.007 | 0.028 | 0.004 | (0.173) | 0.021 | 0.04 |
| EXAMPLE 3 | 3 | FCW | Ar | 0.05 | 0.92 | 1.84 | 0.009 | 0.029 | 0.005 | (0.155) | 0.019 | 0.05 |
| EXAMPLE 4 | 4 | FCW | Ar | 0.12 | 0.88 | 1.82 | 0.008 | 0.030 | 0.004 | (0.173) | 0.022 | 0.04 |
| EXAMPLE 5 | 5 | FCW | Ar | 0.14 | 0.90 | 1.82 | 0.008 | 0.029 | 0.006 | (0.180) | 0.026 | 0.08 |
| EXAMPLE 6 | 6 | FCW | Ar | 0.06 | 0.30 | 1.76 | 0.008 | 0.019 | 0.004 | (0.087) | 0.034 | 0.06 |
| EXAMPLE 7 | 7 | FCW | Ar | 0.05 | 0.51 | 1.69 | 0.007 | 0.031 | 0.005 | (0.166) | 0.029 | 0.04 |
| EXAMPLE 8 | 8 | FCW | Ar | 0.07 | 1.19 | 1.81 | 0.008 | 0.026 | 0.004 | (0.212) | 0.022 | 0.11 |
| EXAMPLE 9 | 9 | FCW | Ar | 0.05 | 1.50 | 1.72 | 0.006 | 0.041 | 0.006 | (0.346) | 0.024 | 0.09 |
| EXAMPLE 10 | 10 | FCW | Ar | 0.06 | 0.88 | 0.70 | 0.010 | 0.046 | 0.006 | (0.205) | 0.019 | 0.08 |
| EXAMPLE 11 | 11 | FCW | Ar | 0.06 | 0.93 | 1.01 | 0.011 | 0.035 | 0.004 | (0.148) | 0.017 | 0.11 |
| EXAMPLE 12 | 12 | FCW | Ar | 0.07 | 1.01 | 2.08 | 0.009 | 0.018 | 0.004 | (0.081) | 0.012 | 0.05 |
| EXAMPLE 13 | 13 | FCW | Ar | 0.11 | 0.80 | 2.29 | 0.008 | 0.024 | 0.006 | (0.068) | 0.031 | 0.14 |

TABLE 1-continued

| | | | | | | | | | | | | |
|---|---|---|---|---|---|---|---|---|---|---|---|---|
| EXAMPLE 14 | 14 | FCW | Ar | 0.06 | 0.78 | 1.81 | 0.029 | 0.026 | 0.005 | (0.076) | 0.025 | 0.06 |
| EXAMPLE 15 | 15 | FCW | Ar | 0.04 | 0.91 | 1.79 | 0.006 | 0.010 | 0.004 | (0.053) | 0.023 | 0.08 |
| EXAMPLE 16 | 16 | FCW | Ar | 0.06 | 0.87 | 1.78 | 0.009 | 0.019 | 0.005 | (0.094) | 0.035 | 0.15 |
| EXAMPLE 17 | 17 | FCW | Ar | 0.06 | 0.95 | 1.81 | 0.008 | 0.058 | 0.004 | (0.297) | 0.027 | 0.13 |
| EXAMPLE 18 | 18 | FCW | Ar | 0.10 | 1.20 | 1.68 | 0.008 | 0.099 | 0.004 | (0.550) | 0.015 | 0.07 |
| EXAMPLE 19 | 19 | FCW | Ar | 0.06 | 0.99 | 1.77 | 0.007 | 0.071 | 0.006 | (0.451) | 0.150 | 0.08 |
| EXAMPLE 20 | 20 | FCW | Ar | 0.07 | 0.70 | 1.80 | 0.009 | 0.036 | 0.005 | (0.170) | 0.030 | 0.01 |
| EXAMPLE 21 | 21 | FCW | Ar | 0.06 | 0.72 | 1.85 | 0.008 | 0.032 | 0.004 | (0.175) | 0.025 | 0.02 |
| EXAMPLE 22 | 22 | FCW | Ar | 0.07 | 0.77 | 1.74 | 0.008 | 0.033 | 0.006 | (0.150) | 0.020 | 0.08 |
| EXAMPLE 23 | 23 | FCW | Ar | 0.05 | 0.75 | 1.76 | 0.007 | 0.028 | 0.006 | (0.139) | 0.024 | 0.18 |
| COMPARATIVE EXAMPLE 1 | 24 | FCW | Ar | 0.04 | 0.90 | 1.52 | 0.008 | 0.022 | 0.021 | (0.030) | 0.010 | 0.04 |
| COMPARATIVE EXAMPLE 2 | 25 | FCW | Ar | 0.06 | 0.88 | 1.83 | 0.006 | 0.042 | 0.040 | (0.049) | 0.020 | 0.06 |
| COMPARATIVE EXAMPLE 3 | 26 | FCW | Ar | 0.03 | 0.95 | 1.76 | 0.004 | 0.038 | 0.037 | (0.043) | 0.024 | 0.05 |
| COMPARATIVE EXAMPLE 4 | 27 | FCW | Ar | 0.04 | 0.80 | 1.68 | 0.005 | 0.043 | 0.044 | (0.035) | 0.018 | 0.07 |

| | EVALUATION OF S CONTENT | FLUX CONTENT (%) | BEAD APPEARANCE | AMOUNT OF SPATTERS (g/min) | EVALUATION |
|---|---|---|---|---|---|
| EXAMPLE 1 | P | 15.5 | P | 0.09 | P |
| EXAMPLE 2 | P | 14.2 | P | 0.10 | P |
| EXAMPLE 3 | P | 16.0 | P | 0.12 | P |
| EXAMPLE 4 | P | 15.4 | P | 0.15 | P |
| EXAMPLE 5 | P | 13.2 | P | 0.31 | P |
| EXAMPLE 6 | P | 18.0 | P | 0.21 | P |
| EXAMPLE 7 | P | 16.1 | P | 0.20 | P |
| EXAMPLE 8 | P | 10.6 | P | 0.30 | P |
| EXAMPLE 9 | P | 10.3 | P | 0.36 | P |
| EXAMPLE 10 | P | 20.1 | P | 0.29 | P |
| EXAMPLE 11 | P | 21.5 | P | 0.26 | P |
| EXAMPLE 12 | P | 18.2 | P | 0.19 | P |
| EXAMPLE 13 | P | 28.9 | P | 0.34 | P |
| EXAMPLE 14 | P | 29.7 | P | 0.41 | P |
| EXAMPLE 15 | P | 12.2 | P | 0.15 | P |
| EXAMPLE 16 | P | 15.8 | P | 0.17 | P |
| EXAMPLE 17 | P | 18.4 | P | 0.14 | P |
| EXAMPLE 18 | P | 17.4 | P | 0.22 | P |
| EXAMPLE 19 | P | 14.6 | P | 0.31 | P |
| EXAMPLE 20 | P | 18.8 | P | 0.31 | P |
| EXAMPLE 21 | P | 16.4 | P | 0.26 | P |
| EXAMPLE 22 | P | 18.8 | P | 0.18 | P |
| EXAMPLE 23 | P | 16.5 | P | 0.24 | P |
| COMPARATIVE EXAMPLE 1 | F | 11.1 | P | 0.63 | F |
| COMPARATIVE EXAMPLE 2 | F | 22.0 | P | 0.72 | F |
| COMPARATIVE EXAMPLE 3 | F | 17.5 | P | 0.66 | F |
| COMPARATIVE EXAMPLE 4 | F | 10.9 | P | 0.76 | F |

TABLE 2

| | WIRE No. | WIRE TYPE | SHIELDING GAS | WIRE COMPOSITION (% by mass) | | | | | | | | |
|---|---|---|---|---|---|---|---|---|---|---|---|---|
| | | | | C | Si | Mn | P | S | $[S_h]$ | $[S_f]$ | Cr | Ti |
| COMPARATIVE EXAMPLE 5 | 28 | FCW | Ar | 0.01 | 0.80 | 1.85 | 0.006 | 0.035 | 0.005 | (0.318) | 0.015 | 0.14 |
| COMPARATIVE EXAMPLE 6 | 29 | FCW | Ar | 0.16 | 0.72 | 1.82 | 0.005 | 0.034 | 0.005 | (0.304) | 0.018 | 0.08 |
| COMPARATIVE EXAMPLE 7 | 30 | FCW | Ar | 0.09 | 0.28 | 1.79 | 0.008 | 0.042 | 0.005 | (0.124) | 0.031 | 0.12 |
| COMPARATIVE EXAMPLE 8 | 31 | FCW | Ar | 0.06 | 1.51 | 1.69 | 0.006 | 0.035 | 0.005 | (0.104) | 0.027 | 0.06 |
| COMPARATIVE EXAMPLE 9 | 32 | FCW | Ar | 0.07 | 0.49 | 0.69 | 0.006 | 0.033 | 0.005 | (0.176) | 0.020 | 0.07 |
| COMPARATIVE EXAMPLE 10 | 33 | FCW | Ar | 0.06 | 0.76 | 2.32 | 0.007 | 0.030 | 0.005 | (0.173) | 0.014 | 0.08 |
| COMPARATIVE EXAMPLE 11 | 34 | FCW | Ar | 0.06 | 0.81 | 1.74 | 0.035 | 0.034 | 0.005 | (0.175) | 0.020 | 0.13 |
| COMPARATIVE EXAMPLE 12 | 35 | FCW | Ar | 0.08 | 0.74 | 1.59 | 0.011 | 0.006 | 0.004 | (0.015) | 0.016 | 0.11 |
| COMPARATIVE EXAMPLE 13 | 36 | FCW | Ar | 0.04 | 0.83 | 1.88 | 0.008 | 0.105 | 0.005 | (0.825) | 0.018 | 0.13 |
| COMPARATIVE EXAMPLE 14 | 37 | FCW | Ar | 0.08 | 0.68 | 1.79 | 0.007 | 0.031 | 0.005 | (0.178) | 0.152 | 0.06 |
| COMPARATIVE EXAMPLE 15 | 38 | FCW | Ar | 0.05 | 0.79 | 1.84 | 0.009 | 0.048 | 0.005 | (0.262) | 0.028 | 0.006 |
| COMPARATIVE EXAMPLE 16 | 39 | FCW | Ar | 0.06 | 0.84 | 1.69 | 0.008 | 0.051 | 0.005 | (0.250) | 0.024 | 0.20 |
| COMPARATIVE EXAMPLE 17 | 1 | FCW | Ar + 20% $CO_2$ | 0.02 | 0.89 | 1.80 | 0.008 | 0.031 | 0.005 | (0.173) | 0.020 | 0.03 |
| COMPARATIVE EXAMPLE 18 | 2 | FCW | Ar + 20% $CO_2$ | 0.03 | 0.91 | 1.79 | 0.005 | 0.028 | 0.004 | (0.173) | 0.021 | 0.04 |
| COMPARATIVE EXAMPLE 19 | 3 | FCW | Ar + 20% $CO_2$ | 0.05 | 0.92 | 1.84 | 0.009 | 0.029 | 0.005 | (0.155) | 0.019 | 0.05 |
| COMPARATIVE EXAMPLE 20 | 4 | FCW | Ar + 20% $CO_2$ | 0.12 | 0.88 | 1.82 | 0.006 | 0.030 | 0.004 | (0.173) | 0.022 | 0.04 |
| COMPARATIVE EXAMPLE 21 | 5 | FCW | Ar + 20% $CO_2$ | 0.14 | 0.90 | 1.82 | 0.008 | 0.029 | 0.006 | (0.180) | 0.026 | 0.08 |
| COMPARATIVE EXAMPLE 22 | 6 | FCW | Ar + 20% $CO_2$ | 0.06 | 0.30 | 1.76 | 0.008 | 0.019 | 0.004 | (0.087) | 0.034 | 0.06 |
| COMPARATIVE EXAMPLE 23 | 7 | FCW | Ar + 20% $CO_2$ | 0.05 | 0.51 | 1.69 | 0.007 | 0.031 | 0.005 | (0.166) | 0.029 | 0.04 |
| COMPARATIVE EXAMPLE 24 | 8 | FCW | Ar + 20% $CO_2$ | 0.07 | 1.19 | 1.81 | 0.008 | 0.026 | 0.004 | (0.212) | 0.022 | 0.11 |
| COMPARATIVE EXAMPLE 25 | 9 | FCW | Ar + 20% $CO_2$ | 0.05 | 1.50 | 1.72 | 0.006 | 0.041 | 0.006 | (0.346) | 0.024 | 0.09 |
| COMPARATIVE EXAMPLE 26 | 10 | FCW | Ar + 20% $CO_2$ | 0.06 | 0.88 | 0.70 | 0.010 | 0.046 | 0.006 | (0.205) | 0.019 | 0.08 |
| COMPARATIVE EXAMPLE 27 | 11 | FCW | Ar + 20% $CO_2$ | 0.06 | 0.93 | 1.01 | 0.011 | 0.035 | 0.004 | (0.148) | 0.017 | 0.11 |

TABLE 2-continued

| | | | | | | | | | | | | |
|---|---|---|---|---|---|---|---|---|---|---|---|---|
| COMPARATIVE EXAMPLE 28 | 12 | FCW | Ar + 20% CO$_2$ | 0.07 | 1.01 | 2.08 | 0.009 | 0.018 | 0.004 | (0.081) | 0.012 | 0.05 |
| COMPARATIVE EXAMPLE 29 | 13 | FCW | Ar + 20% CO$_2$ | 0.11 | 0.80 | 2.29 | 0.008 | 0.024 | 0.006 | (0.068) | 0.031 | 0.14 |
| COMPARATIVE EXAMPLE 30 | 14 | FCW | Ar + 20% CO$_2$ | 0.06 | 0.78 | 1.81 | 0.029 | 0.026 | 0.005 | (0.076) | 0.025 | 0.06 |
| COMPARATIVE EXAMPLE 31 | 15 | FCW | Ar + 20% CO$_2$ | 0.04 | 0.91 | 1.79 | 0.006 | 0.010 | 0.004 | (0.053) | 0.023 | 0.08 |

| | EVALUATION OF S CONTENT | FLUX CONTENT (%) | BEAD APPEARANCE | AMOUNT OF SPATTERS (g/min) | EVALUATION |
|---|---|---|---|---|---|
| COMPARATIVE EXAMPLE 5 | P | 9.6 | F | 0.61 | F |
| COMPARATIVE EXAMPLE 6 | P | 9.7 | F | 0.73 | F |
| COMPARATIVE EXAMPLE 7 | P | 31.2 | F | 0.80 | F |
| COMPARATIVE EXAMPLE 8 | P | 30.3 | F | 0.74 | F |
| COMPARATIVE EXAMPLE 9 | P | 16.4 | P | 0.70 | F |
| COMPARATIVE EXAMPLE 10 | P | 14.9 | F | 0.63 | F |
| COMPARATIVE EXAMPLE 11 | P | 17.1 | P | 0.61 | F |
| COMPARATIVE EXAMPLE 12 | P | 18.1 | F | 0.20 | P |
| COMPARATIVE EXAMPLE 13 | P | 12.2 | F | 0.33 | P |
| COMPARATIVE EXAMPLE 14 | P | 15.0 | F | 0.36 | P |
| COMPARATIVE EXAMPLE 15 | P | 16.7 | F | 0.32 | P |
| COMPARATIVE EXAMPLE 16 | P | 18.8 | F | 0.26 | P |
| COMPARATIVE EXAMPLE 17 | P | 15.5 | F | 1.03 | F |
| COMPARATIVE EXAMPLE 18 | P | 14.2 | F | 1.10 | F |
| COMPARATIVE EXAMPLE 19 | P | 16.0 | F | 1.05 | F |
| COMPARATIVE EXAMPLE 20 | P | 15.4 | F | 1.21 | F |
| COMPARATIVE EXAMPLE 21 | P | 13.2 | F | 1.29 | F |
| COMPARATIVE EXAMPLE 22 | P | 18.0 | F | 1.26 | F |
| COMPARATIVE EXAMPLE 23 | P | 16.1 | F | 1.24 | F |
| COMPARATIVE EXAMPLE 24 | P | 10.6 | F | 1.15 | F |
| COMPARATIVE EXAMPLE 25 | P | 10.3 | F | 1.23 | F |
| COMPARATIVE EXAMPLE 26 | P | 20.1 | F | 1.18 | F |
| COMPARATIVE EXAMPLE 27 | P | 21.5 | F | 1.17 | F |
| COMPARATIVE EXAMPLE 28 | P | 18.2 | F | 1.24 | F |
| COMPARATIVE EXAMPLE 29 | P | 28.9 | F | 1.20 | F |
| COMPARATIVE EXAMPLE 30 | P | 29.7 | F | 1.23 | F |
| COMPARATIVE EXAMPLE 31 | P | 12.2 | F | 1.18 | F |

TABLE 3

| | WIRE No. | WIRE TYPE | SHIELDING GAS | WIRE COMPOSITION (% by mass) | | | | | | | | |
|---|---|---|---|---|---|---|---|---|---|---|---|---|
| | | | | C | Si | Mn | P | S | $[S_h]$ | $[S_f]$ | Cr | Ti |
| COMPARATIVE EXAMPLE 32 | 16 | FCW | Ar + 20% CO$_2$ | 0.06 | 0.87 | 1.78 | 0.009 | 0.019 | 0.005 | (0.094) | 0.035 | 0.15 |
| COMPARATIVE EXAMPLE 33 | 17 | FCW | Ar + 20% CO$_2$ | 0.06 | 0.95 | 1.81 | 0.008 | 0.058 | 0.004 | (0.297) | 0.027 | 0.13 |
| COMPARATIVE EXAMPLE 34 | 18 | FCW | Ar + 20% CO$_2$ | 0.10 | 1.20 | 1.68 | 0.008 | 0.099 | 0.004 | (0.550) | 0.015 | 0.07 |
| COMPARATIVE EXAMPLE 35 | 19 | FCW | Ar + 20% CO$_2$ | 0.06 | 0.99 | 1.77 | 0.007 | 0.071 | 0.006 | (0.451) | 0.150 | 0.08 |
| COMPARATIVE EXAMPLE 36 | 20 | FCW | Ar + 20% CO$_2$ | 0.07 | 0.70 | 1.80 | 0.009 | 0.036 | 0.005 | (0.170) | 0.030 | 0.01 |
| COMPARATIVE EXAMPLE 37 | 21 | FCW | Ar + 20% CO$_2$ | 0.06 | 0.72 | 1.85 | 0.008 | 0.032 | 0.004 | (0.175) | 0.025 | 0.02 |
| COMPARATIVE EXAMPLE 38 | 22 | FCW | Ar + 20% CO$_2$ | 0.07 | 0.77 | 1.74 | 0.008 | 0.033 | 0.006 | (0.150) | 0.020 | 0.08 |
| COMPARATIVE EXAMPLE 39 | 23 | FCW | Ar + 20% CO$_2$ | 0.05 | 0.75 | 1.76 | 0.007 | 0.028 | 0.006 | (0.139) | 0.024 | 0.18 |
| COMPARATIVE EXAMPLE 40 | 36 | solid | Ar | 0.02 | 0.86 | 1.62 | 0.006 | 0.035 | — | — | 0.016 | 0.04 |
| COMPARATIVE EXAMPLE 41 | 37 | solid | Ar | 0.04 | 0.85 | 1.51 | 0.007 | 0.034 | — | — | 0.025 | 0.03 |
| COMPARATIVE EXAMPLE 42 | 38 | solid | Ar | 0.06 | 0.95 | 1.75 | 0.008 | 0.026 | — | — | 0.031 | 0.04 |
| COMPARATIVE EXAMPLE 43 | 39 | solid | Ar | 0.13 | 0.84 | 1.90 | 0.006 | 0.034 | — | — | 0.024 | 0.05 |
| COMPARATIVE EXAMPLE 44 | 40 | solid | Ar | 0.19 | 0.92 | 1.80 | 0.010 | 0.036 | — | — | 0.033 | 0.10 |
| COMPARATIVE EXAMPLE 45 | 41 | solid | Ar | 0.08 | 0.32 | 1.63 | 0.009 | 0.022 | — | — | 0.026 | 0.07 |
| COMPARATIVE EXAMPLE 46 | 42 | solid | Ar | 0.04 | 0.55 | 1.85 | 0.011 | 0.033 | — | — | 0.022 | 0.06 |
| COMPARATIVE EXAMPLE 47 | 43 | solid | Ar | 0.07 | 1.12 | 1.88 | 0.006 | 0.029 | — | — | 0.031 | 0.09 |
| COMPARATIVE EXAMPLE 48 | 44 | solid | Ar | 0.08 | 1.46 | 1.64 | 0.004 | 0.036 | — | — | 0.027 | 0.11 |
| COMPARATIVE EXAMPLE 49 | 45 | solid | Ar | 0.04 | 0.76 | 0.73 | 0.008 | 0.038 | — | — | 0.024 | 0.12 |
| COMPARATIVE EXAMPLE 50 | 46 | solid | Ar | 0.04 | 0.53 | 1.12 | 0.012 | 0.028 | — | — | 0.016 | 0.08 |
| COMPARATIVE EXAMPLE 51 | 47 | solid | Ar | 0.08 | 0.99 | 1.99 | 0.008 | 0.029 | — | — | 0.024 | 0.10 |
| COMPARATIVE EXAMPLE 52 | 48 | solid | Ar | 0.09 | 0.74 | 2.04 | 0.005 | 0.017 | — | — | 0.019 | 0.08 |
| COMPARATIVE EXAMPLE 53 | 49 | solid | Ar | 0.07 | 0.68 | 1.74 | 0.035 | 0.029 | — | — | 0.020 | 0.13 |
| COMPARATIVE EXAMPLE 54 | 50 | solid | Ar | 0.03 | 0.95 | 1.65 | 0.010 | 0.011 | — | — | 0.040 | 0.04 |
| COMPARATIVE EXAMPLE 55 | 51 | solid | Ar | 0.08 | 0.86 | 1.82 | 0.015 | 0.017 | — | — | 0.036 | 0.06 |
| COMPARATIVE EXAMPLE 56 | 52 | solid | Ar | 0.04 | 1.06 | 1.61 | 0.013 | 0.062 | — | — | 0.022 | 0.11 |
| COMPARATIVE EXAMPLE 57 | 53 | solid | Ar | 0.08 | 0.84 | 1.91 | 0.017 | 0.106 | — | — | 0.034 | 0.05 |
| COMPARATIVE EXAMPLE 58 | 54 | solid | Ar | 0.03 | 0.92 | 1.89 | 0.009 | 0.061 | — | — | 0.146 | 0.05 |

TABLE 3-continued

| | EVALUATION OF S CONTENT | FLUX CONTENT (%) | BEAD APPEARANCE | AMOUNT OF SPATTERS (g/min) | EVALUATION |
|---|---|---|---|---|---|
| COMPARATIVE EXAMPLE 32 | P | 15.8 | F | 1.19 | F |
| COMPARATIVE EXAMPLE 33 | P | 18.4 | F | 1.21 | F |
| COMPARATIVE EXAMPLE 34 | P | 17.4 | F | 1.20 | F |
| COMPARATIVE EXAMPLE 35 | P | 14.6 | F | 1.24 | F |
| COMPARATIVE EXAMPLE 36 | P | 18.8 | F | 1.16 | F |
| COMPARATIVE EXAMPLE 37 | P | 16.4 | F | 1.19 | F |
| COMPARATIVE EXAMPLE 38 | P | 18.8 | F | 1.19 | F |
| COMPARATIVE EXAMPLE 39 | P | 16.5 | F | 1.24 | F |
| COMPARATIVE EXAMPLE 40 | — | — | F | 2.51 | F |
| COMPARATIVE EXAMPLE 41 | — | — | F | 2.61 | F |
| COMPARATIVE EXAMPLE 42 | — | — | F | 2.66 | F |
| COMPARATIVE EXAMPLE 43 | — | — | F | 2.43 | F |
| COMPARATIVE EXAMPLE 44 | — | — | F | 2.94 | F |
| COMPARATIVE EXAMPLE 45 | — | — | F | 3.04 | F |
| COMPARATIVE EXAMPLE 46 | — | — | F | 2.82 | F |
| COMPARATIVE EXAMPLE 47 | — | — | F | 2.60 | F |
| COMPARATIVE EXAMPLE 48 | — | — | F | 2.25 | F |
| COMPARATIVE EXAMPLE 49 | — | — | F | 1.94 | F |
| COMPARATIVE EXAMPLE 50 | — | — | F | 2.20 | F |
| COMPARATIVE EXAMPLE 51 | — | — | F | 2.20 | F |
| COMPARATIVE EXAMPLE 52 | — | — | F | 2.55 | F |
| COMPARATIVE EXAMPLE 53 | — | — | F | 2.43 | F |
| COMPARATIVE EXAMPLE 54 | — | — | F | 2.42 | F |
| COMPARATIVE EXAMPLE 55 | — | — | F | 2.61 | F |
| COMPARATIVE EXAMPLE 56 | — | — | F | 1.60 | F |
| COMPARATIVE EXAMPLE 57 | — | — | F | 1.81 | F |
| COMPARATIVE EXAMPLE 58 | — | — | F | 2.42 | F |

TABLE 4

| | WIRE No. | WIRE TYPE | SHIELDING GAS | WIRE COMPOSITION (% by mass) | | | | | | | | |
|---|---|---|---|---|---|---|---|---|---|---|---|---|
| | | | | C | Si | Mn | P | S | $[S_h]$ | $[S_f]$ | Cr | Ti |
| COMPARATIVE EXAMPLE 59 | 55 | solid | Ar | 0.04 | 0.85 | 1.55 | 0.019 | 0.024 | — | — | 0.027 | 0.01 |
| COMPARATIVE EXAMPLE 60 | 56 | solid | Ar | 0.06 | 0.68 | 1.73 | 0.013 | 0.041 | — | — | 0.022 | 0.03 |
| COMPARATIVE EXAMPLE 61 | 57 | solid | Ar | 0.10 | 0.82 | 1.76 | 0.006 | 0.033 | — | — | 0.018 | 0.10 |
| COMPARATIVE EXAMPLE 62 | 58 | solid | Ar | 0.06 | 0.67 | 1.92 | 0.008 | 0.045 | — | — | 0.016 | 0.17 |
| COMPARATIVE EXAMPLE 63 | 36 | solid | Ar + 20% $CO_2$ | 0.02 | 0.86 | 1.62 | 0.006 | 0.035 | — | — | 0.016 | 0.04 |
| COMPARATIVE EXAMPLE 64 | 37 | solid | Ar + 20% $CO_2$ | 0.04 | 0.85 | 1.51 | 0.007 | 0.034 | — | — | 0.025 | 0.03 |
| COMPARATIVE EXAMPLE 65 | 38 | solid | Ar + 20% $CO_2$ | 0.06 | 0.95 | 1.75 | 0.008 | 0.026 | — | — | 0.031 | 0.04 |
| COMPARATIVE EXAMPLE 66 | 39 | solid | Ar + 20% $CO_2$ | 0.13 | 0.84 | 1.90 | 0.006 | 0.034 | — | — | 0.024 | 0.05 |
| COMPARATIVE EXAMPLE 67 | 40 | solid | Ar + 20% $CO_2$ | 0.19 | 0.92 | 1.80 | 0.010 | 0.036 | — | — | 0.033 | 0.10 |
| COMPARATIVE EXAMPLE 68 | 41 | solid | Ar + 20% $CO_2$ | 0.08 | 0.32 | 1.63 | 0.009 | 0.022 | — | — | 0.026 | 0.07 |
| COMPARATIVE EXAMPLE 69 | 42 | solid | Ar + 20% $CO_2$ | 0.04 | 0.55 | 1.85 | 0.011 | 0.033 | — | — | 0.022 | 0.06 |
| COMPARATIVE EXAMPLE 70 | 43 | solid | Ar + 20% $CO_2$ | 0.07 | 1.12 | 1.88 | 0.006 | 0.029 | — | — | 0.031 | 0.09 |
| COMPARATIVE EXAMPLE 71 | 44 | solid | Ar + 20% $CO_2$ | 0.08 | 1.46 | 1.64 | 0.004 | 0.036 | — | — | 0.027 | 0.11 |
| COMPARATIVE EXAMPLE 72 | 45 | solid | Ar + 20% $CO_2$ | 0.04 | 0.76 | 0.73 | 0.008 | 0.038 | — | — | 0.024 | 0.12 |
| COMPARATIVE EXAMPLE 73 | 46 | solid | Ar + 20% $CO_2$ | 0.04 | 0.53 | 1.12 | 0.012 | 0.028 | — | — | 0.016 | 0.08 |
| COMPARATIVE EXAMPLE 74 | 47 | solid | Ar + 20% $CO_2$ | 0.08 | 0.99 | 1.99 | 0.008 | 0.029 | — | — | 0.024 | 0.10 |
| COMPARATIVE EXAMPLE 75 | 48 | solid | Ar + 20% $CO_2$ | 0.09 | 0.74 | 2.04 | 0.005 | 0.017 | — | — | 0.019 | 0.08 |
| COMPARATIVE EXAMPLE 76 | 49 | solid | Ar + 20% $CO_2$ | 0.07 | 0.68 | 1.74 | 0.035 | 0.029 | — | — | 0.020 | 0.13 |
| COMPARATIVE EXAMPLE 77 | 50 | solid | Ar + 20% $CO_2$ | 0.03 | 0.95 | 1.65 | 0.010 | 0.011 | — | — | 0.040 | 0.04 |
| COMPARATIVE EXAMPLE 78 | 51 | solid | Ar + 20% $CO_2$ | 0.08 | 0.86 | 1.82 | 0.015 | 0.017 | — | — | 0.036 | 0.06 |
| COMPARATIVE EXAMPLE 79 | 52 | solid | Ar + 20% $CO_2$ | 0.04 | 1.06 | 1.61 | 0.013 | 0.062 | — | — | 0.022 | 0.11 |
| COMPARATIVE EXAMPLE 80 | 53 | solid | Ar + 20% $CO_2$ | 0.08 | 0.84 | 1.91 | 0.017 | 0.106 | — | — | 0.034 | 0.05 |
| COMPARATIVE EXAMPLE 81 | 54 | solid | Ar + 20% $CO_2$ | 0.03 | 0.92 | 1.89 | 0.009 | 0.061 | — | — | 0.146 | 0.05 |
| COMPARATIVE EXAMPLE 82 | 55 | solid | Ar + 20% $CO_2$ | 0.04 | 0.85 | 1.55 | 0.019 | 0.024 | — | — | 0.027 | 0.01 |
| COMPARATIVE EXAMPLE 83 | 56 | solid | Ar + 20% $CO_2$ | 0.06 | 0.68 | 1.73 | 0.013 | 0.041 | — | — | 0.022 | 0.03 |
| COMPARATIVE EXAMPLE 84 | 57 | solid | Ar + 20% $CO_2$ | 0.10 | 0.82 | 1.76 | 0.006 | 0.033 | — | — | 0.018 | 0.10 |
| COMPARATIVE EXAMPLE 85 | 58 | solid | Ar + 20% $CO_2$ | 0.06 | 0.67 | 1.92 | 0.008 | 0.045 | — | — | 0.016 | 0.17 |

| | EVALUATION OF S CONTENT | FLUX CONTENT (%) | BEAD APPEARANCE | AMOUNT OF SPATTERS (g/min) | EVALUATION |
|---|---|---|---|---|---|
| COMPARATIVE EXAMPLE 59 | — | — | F | 2.28 | F |
| COMPARATIVE EXAMPLE 60 | — | — | F | 2.41 | F |
| COMPARATIVE EXAMPLE 61 | — | — | F | 2.84 | F |
| COMPARATIVE EXAMPLE 62 | — | — | F | 2.46 | F |
| COMPARATIVE EXAMPLE 63 | — | — | F | 0.68 | F |

TABLE 4-continued

| | | | | | |
|---|---|---|---|---|---|
| COMPARATIVE EXAMPLE 64 | — | — | F | 0.70 | F |
| COMPARATIVE EXAMPLE 65 | — | — | F | 0.69 | F |
| COMPARATIVE EXAMPLE 66 | — | — | F | 0.67 | F |
| COMPARATIVE EXAMPLE 67 | — | — | F | 0.82 | F |
| COMPARATIVE EXAMPLE 68 | — | — | F | 0.63 | F |
| COMPARATIVE EXAMPLE 69 | — | — | F | 0.70 | F |
| COMPARATIVE EXAMPLE 70 | — | — | F | 0.68 | F |
| COMPARATIVE EXAMPLE 71 | — | — | F | 0.70 | F |
| COMPARATIVE EXAMPLE 72 | — | — | F | 0.71 | F |
| COMPARATIVE EXAMPLE 73 | — | — | F | 0.69 | F |
| COMPARATIVE EXAMPLE 74 | — | — | F | 0.75 | F |
| COMPARATIVE EXAMPLE 75 | — | — | F | 0.69 | F |
| COMPARATIVE EXAMPLE 76 | — | — | F | 0.74 | F |
| COMPARATIVE EXAMPLE 77 | — | — | F | 0.76 | F |
| COMPARATIVE EXAMPLE 78 | — | — | F | 0.81 | F |
| COMPARATIVE EXAMPLE 79 | — | — | F | 0.68 | F |
| COMPARATIVE EXAMPLE 80 | — | — | F | 0.81 | F |
| COMPARATIVE EXAMPLE 81 | — | — | F | 0.75 | F |
| COMPARATIVE EXAMPLE 82 | — | — | F | 0.68 | F |
| COMPARATIVE EXAMPLE 83 | — | — | F | 0.76 | F |
| COMPARATIVE EXAMPLE 84 | — | — | F | 0.74 | F |
| COMPARATIVE EXAMPLE 85 | — | — | F | 0.80 | F |

As described in Table 1, in Examples 1 to 23 using flux-cored welding wires 1 to 23 produced within the range of the present invention, the bead appearance and the amount of spatters were both satisfactory. In particular, in Example 3 using flux-cored welding wire 3, in which all components thereof fell within preferred ranges, the bead appearance and the amount of spatters were both excellent.

In contrast, in Comparative Examples 1 to 85 described in Tables 1 to 4, there were problems with the bead appearance and the amount of spatters. Specifically, in Comparative Examples 1 to 4 using flux-cored welding wires 24 to 27 in which the relationship between the S content of the flux [$S_f$] and the S content of the sheath [$S_h$] did not satisfy formula (1), droplet transfer was not stabilized to generate large spatters.

In Comparative Examples 5 to 16 using flux-cored welding wires 28 to 39, in which any of the components constituting each of the wires was outside the range of the present invention, defective bead appearance or a large amount of spatters were observed. Among these comparative examples, in Comparative Examples 5 to 8, in which the flux content was outside the range of the present invention, droplet transfer was not stabilized, resulting in defective bead appearance.

In Comparative Examples 17 to 39, flux-cored welding wires 1 to 23 were used as in examples. However, the Ar/$CO_2$ mixed gas ($CO_2$ content: 20% by volume) was used as a shielding gas; hence, slag was generated, and a large amount of spatters was also generated. In Comparative Examples 40 to 62, in which welding was performed with solid wires having components comparable to those of the flux-cored welding wires 1 to 23 using pure Ar gas, it was difficult to perform welding using pure Ar shielding gas, failing to form a normal bead. Furthermore, a large amount of large spatters was generated.

In Comparative Examples 63 to 85, arc welding was performed with the Ar/$CO_2$ mixed gas ($CO_2$ content: 20% by volume) serving as a shielding gas using the same solid wires as those used in Comparative Examples 40 to 62. It is known that in the case where the Ar/20% $CO_2$ shielding gas is used, the amount of spatters is reduced when welding is performed with a solid wire, compared with a flux-cored welding wire. In Comparative Examples 63 to 85, the amount of spatters was reduced, compared with Comparative Examples 40 to 62. However, no sample was acceptable. Furthermore, slag was generated on any bead, so the bead appearance was not good.

Second Example

In a second example corresponding to the second embodiment of the present invention, arc welding of carbon steel was performed with the flux-cored welding wire produced within the range of the present invention using pure Ar shielding gas under different pulse conditions. The amount of spatters was evaluated. In this case, before use of base metals, black scale on carbon steel SS400 was removed by a grinder. As the wire, flux-cored welding wire 3 described in Table 1 was used for all examples and comparative examples. Welding was performed under conditions as follows: bead-on, wire extension (Ext): 15 mm, welding speed: 60 cm/min, and gas flow rate: 25 L/min, pulse peak current: 320 to 550 A, and peak time: 0.6 to 2.6 ms.

Evaluation

As with the first example, the evaluation criteria of the amount of spatters are as follows:
P: 0.6 g/min or less,
F: more than 0.6 g/min.

Figure 2:
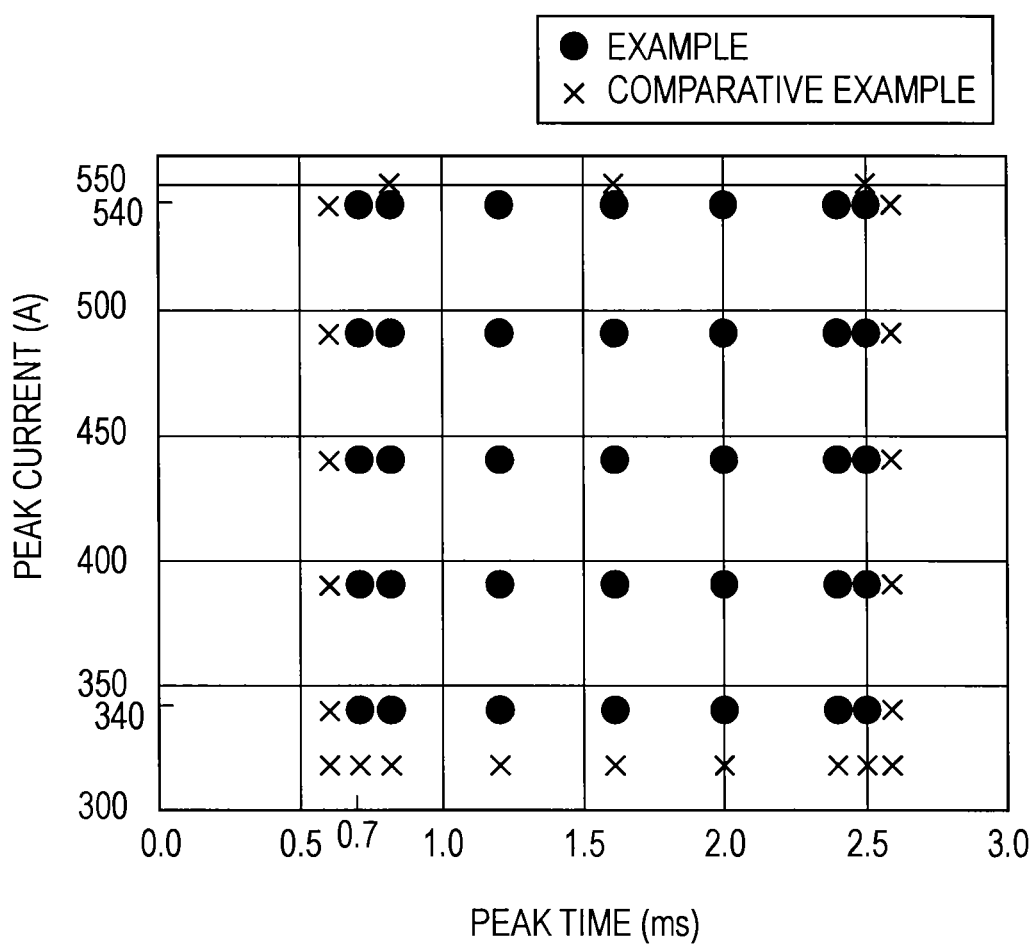
FIG. 2 is a graph illustrating the relationship between the pulse conditions and the amount of spatters, the horizontal axis representing the peak time, and the vertical axis representing the peak current.

Tables 5 and 6 illustrate the results. FIG. 2 is a graph illustrating the relationship between the pulse conditions and the amount of spatters, the horizontal axis representing the peak time, and the vertical axis representing the peak current.

TABLE 5

| | WIRE No. | SHIELDING GAS | PEAK CURRENT (A) | PEAK TIME (ms) | AMOUNT OF SPATTERS (g/min) | EVALUATION |
|---|---|---|---|---|---|---|
| EXAMPLE 101 | 3 | Ar | 340 | 0.7 | 0.58 | P |
| EXAMPLE 102 | 3 | Ar | 340 | 0.8 | 0.51 | P |
| EXAMPLE 103 | 3 | Ar | 340 | 1.2 | 0.47 | P |
| EXAMPLE 104 | 3 | Ar | 340 | 1.6 | 0.47 | P |

TABLE 5-continued

| | WIRE No. | SHIELDING GAS | PEAK CURRENT (A) | PEAK TIME (ms) | AMOUNT OF SPATTERS (g/min) | EVALUATION |
|---|---|---|---|---|---|---|
| EXAMPLE 105 | 3 | Ar | 340 | 2.0 | 0.51 | P |
| EXAMPLE 106 | 3 | Ar | 340 | 2.4 | 0.53 | P |
| EXAMPLE 107 | 3 | Ar | 340 | 2.5 | 0.51 | P |
| EXAMPLE 108 | 3 | Ar | 390 | 0.7 | 0.49 | P |
| EXAMPLE 109 | 3 | Ar | 390 | 0.8 | 0.35 | P |
| EXAMPLE 110 | 3 | Ar | 390 | 1.2 | 0.32 | P |
| EXAMPLE 111 | 3 | Ar | 390 | 1.6 | 0.31 | P |
| EXAMPLE 112 | 3 | Ar | 390 | 2.0 | 0.32 | P |
| EXAMPLE 113 | 3 | Ar | 390 | 2.4 | 0.44 | P |
| EXAMPLE 114 | 3 | Ar | 390 | 2.5 | 0.53 | P |
| EXAMPLE 115 | 3 | Ar | 440 | 0.7 | 0.50 | P |
| EXAMPLE 116 | 3 | Ar | 440 | 0.8 | 0.49 | P |
| EXAMPLE 117 | 3 | Ar | 440 | 1.2 | 0.37 | P |
| EXAMPLE 118 | 3 | Ar | 440 | 1.6 | 0.31 | P |
| EXAMPLE 119 | 3 | Ar | 440 | 2.0 | 0.32 | P |
| EXAMPLE 120 | 3 | Ar | 440 | 2.4 | 0.41 | P |
| EXAMPLE 121 | 3 | Ar | 440 | 2.5 | 0.47 | P |
| EXAMPLE 122 | 3 | Ar | 490 | 0.7 | 0.49 | P |
| EXAMPLE 123 | 3 | Ar | 490 | 0.8 | 0.39 | P |
| EXAMPLE 124 | 3 | Ar | 490 | 1.2 | 0.12 | P |
| EXAMPLE 125 | 3 | Ar | 490 | 1.6 | 0.28 | P |
| EXAMPLE 126 | 3 | Ar | 490 | 2.0 | 0.26 | P |
| EXAMPLE 127 | 3 | Ar | 490 | 2.4 | 0.40 | P |
| EXAMPLE 128 | 3 | Ar | 490 | 2.5 | 0.52 | P |
| EXAMPLE 129 | 3 | Ar | 540 | 0.7 | 0.25 | P |
| EXAMPLE 130 | 3 | Ar | 540 | 0.8 | 0.25 | P |
| EXAMPLE 131 | 3 | Ar | 540 | 1.2 | 0.26 | P |
| EXAMPLE 132 | 3 | Ar | 540 | 1.6 | 0.27 | P |
| EXAMPLE 133 | 3 | Ar | 540 | 2.0 | 0.26 | P |
| EXAMPLE 134 | 3 | Ar | 540 | 2.4 | 0.41 | P |
| EXAMPLE 135 | 3 | Ar | 540 | 2.5 | 0.51 | P |

TABLE 6

| | WIRE No. | SHIELDING GAS | PEAK CURRENT (A) | PEAK TIME (ms) | AMOUNT OF SPATTERS (g/min) | EVALUATION |
|---|---|---|---|---|---|---|
| COMPARATIVE EXAMPLE 101 | 3 | Ar | 540 | 0.6 | 0.66 | F |
| COMPARATIVE EXAMPLE 102 | 3 | Ar | 340 | 0.6 | 0.73 | F |
| COMPARATIVE EXAMPLE 103 | 3 | Ar | 390 | 0.6 | 0.66 | F |
| COMPARATIVE EXAMPLE 104 | 3 | Ar | 440 | 0.6 | 0.65 | F |
| COMPARATIVE EXAMPLE 105 | 3 | Ar | 490 | 0.6 | 0.65 | F |
| COMPARATIVE EXAMPLE 106 | 3 | Ar | 320 | 0.6 | 0.72 | F |
| COMPARATIVE EXAMPLE 107 | 3 | Ar | 320 | 0.7 | 0.73 | F |
| COMPARATIVE EXAMPLE 108 | 3 | Ar | 320 | 0.8 | 0.73 | F |
| COMPARATIVE EXAMPLE 109 | 3 | Ar | 320 | 1.2 | 0.69 | F |
| COMPARATIVE EXAMPLE 110 | 3 | Ar | 320 | 1.6 | 0.63 | F |
| COMPARATIVE EXAMPLE 111 | 3 | Ar | 320 | 2.0 | 0.71 | F |
| COMPARATIVE EXAMPLE 112 | 3 | Ar | 320 | 2.4 | 0.70 | F |
| COMPARATIVE EXAMPLE 113 | 3 | Ar | 320 | 2.5 | 0.70 | F |
| COMPARATIVE EXAMPLE 114 | 3 | Ar | 320 | 2.6 | 0.76 | F |
| COMPARATIVE EXAMPLE 115 | 3 | Ar | 390 | 2.6 | 0.68 | F |
| COMPARATIVE EXAMPLE 116 | 3 | Ar | 440 | 2.6 | 0.71 | F |
| COMPARATIVE EXAMPLE 117 | 3 | Ar | 490 | 2.6 | 0.70 | F |
| COMPARATIVE EXAMPLE 118 | 3 | Ar | 540 | 2.6 | 0.69 | F |
| COMPARATIVE EXAMPLE 119 | 3 | Ar | 340 | 2.6 | 0.62 | F |
| COMPARATIVE EXAMPLE 120 | 3 | Ar | 550 | 0.8 | 0.69 | F |
| COMPARATIVE EXAMPLE 121 | 3 | Ar | 550 | 1.6 | 0.71 | F |
| COMPARATIVE EXAMPLE 122 | 3 | Ar | 550 | 2.5 | 0.75 | F |
| COMPARATIVE EXAMPLE 123 | 3 | Ar | NON-PULSED | — | 0.79 | F |

In Examples 101 to 135 described in Table 5, a droplet was detached from the wire during the pulse peak time, and a droplet was dropped into a molten pool, at which spatters are most readily generated, during a base time. That is, droplet detachment was in a mode of one drop per pulse, thereby resulting in a small amount of spatters.

In contrast, in Comparative Examples 101 to 106 described in Table 6, the pulse peak time was short. The peak time ended before the detachment of a droplet. When a droplet was dropped into a molten pool, the subsequent peak time started, thereby increasing the amount of spatters. In Comparative Examples 107 to 114, the pulse peak current was low. The droplet detachment was not completed during the peak time.

When a droplet was dropped, the subsequent peak time started, thereby increasing the amount of spatters.

In Comparative Examples 114 to 119, the peak time was excessively long. The peak time was continued even after droplet detachment, thereby leading to the generation of spatters. In Comparative Examples 120 to 122, an excessively high peak current resulted in an excessively large droplet formed during the peak time, thereby increasing the amount of spatters generated when the droplet was dropped into a molten pool. In Comparative Example 123, a non-pulsed current was used, thereby generating the largest amount of spatters.

The foregoing results demonstrated that according to the present invention, even when arc welding of carbon steel is performed with pure Ar shielding gas, the amount of spatters generated is small, and excellent bead appearance is provided.

What is claimed is:

1. A flux-cored welding wire comprising:
   a flux having a S content of 0.060% to 0.350% by mass; and
   a sheath comprising carbon steel and filled with the flux, a content of the flux in the flux-cored welding wire being 10.0% to 30.0% by mass,
   the flux-cored welding wire comprising, based on a total mass of the flux-cored welding wire:
   0.02% to 0.15% by mass C;
   0.30% to 1.50% by mass Si;
   0.70% to 2.30% by mass Mn;
   0.010% to 0.100% by mass S;
   0.01% to 0.18% by mass Ti;
   0.030% by mass or less P; and
   0.15% by mass or less Cr,
   wherein
   the S content of flux and a S content of the sheath satisfy formula: $[S_f] > ([S_h] + 0.010)$, where $[S_f]$ represents the S content (% by mass) of the flux, and $[S_h]$ represents the S content (% by mass) of the sheath.

2. A process for arc welding of carbon steel, comprising:
   performing arc welding of carbon steel with a flux-cored welding wire using pure Ar gas serving as a shielding gas with a pulsed current having a peak current of 340 to 540 A and a peak current time of 0.7 to 2.5 ms, the pulsed current serving as a welding current,
   wherein the flux-cored welding wire comprises:
   a flux having a S content of 0.060% to 0.350% by mass; and
   a sheath comprising carbon steel and filled with the flux, a content of the flux in the flux-cored welding wire being 10.0% to 30.0% by mass,
   wherein the flux-cored welding wire comprises, based on a total mass of the flux-cored welding wire:
   0.02% to 0.15% by mass C;
   0.30% to 1.50% by mass Si;
   0.70% to 2.30% by mass Mn;
   0.010% to 0.100% by mass S;
   0.01% to 0.18% by mass Ti;
   0.030% by mass or less P; and
   0.15% by mass or less Cr, and
   wherein
   the S content of flux and a S content of the sheath satisfy formula: $[S_f] > ([S_h] + 0.010)$, where $[S_f]$ represents the S content (% by mass) of the flux, and $[S_h]$ represents the S content (% by mass) of the sheath.

3. The flux-cored welding wire according to claim 1, wherein the flux-cored welding wire comprises Si in a content of 0.50% by mass or more based on the total mass of the flux-cored welding wire.

4. The flux-cored welding wire according to claim 1, wherein the flux-cored welding wire comprises Si in a content of 1.20% by mass or less based on the total mass of the flux-cored welding wire.

5. The flux-cored welding wire according to claim 1, wherein the flux-cored welding wire comprises Mn in a content of 1.00% by mass or more based on the total mass of the flux-cored welding wire.

6. The flux-cored welding wire according to claim 1, wherein the flux-cored welding wire comprises Mn in a content of 2.10% by mass or less based on the total mass of the flux-cored welding wire.

7. The flux-cored welding wire according to claim 1, wherein the flux-cored welding wire comprises S in a range of 0.015% to 0.060% by mass based on the total mass of the flux-cored welding wire.

8. The flux-cored welding wire according to claim 1, wherein the flux-cored welding wire comprises Ti in a range of 0.02% to 0.09% by mass based on the total mass of the flux-cored welding wire.

9. The process according to claim 3, wherein the flux-cored welding wire comprises Si in a content of 0.50% by mass or more based on the total mass of the flux-cored welding wire.

10. The process according to claim 2, wherein the flux-cored welding wire comprises Si in a content of 1.20% by mass or less based on the total mass of the flux-cored welding wire.

11. The process according to claim 2, wherein the flux-cored welding wire comprises Mn in a content of 1.00% by mass or more based on the total mass of the flux-cored welding wire.

12. The process according to claim 2, wherein the flux-cored welding wire comprises Mn in a content of 2.10% by mass or less based on the total mass of the flux-cored welding wire.

13. The process according to claim 2, wherein the flux-cored welding wire comprises S in a range of 0.015% to 0.060% by mass based on the total mass of the flux-cored welding wire.

14. The process according to claim 2, wherein the flux-cored welding wire comprises Ti in a range of 0.02% to 0.09% by mass based on the total mass of the flux-cored welding wire.

* * * * *

UNITED STATES PATENT AND TRADEMARK OFFICE
CERTIFICATE OF CORRECTION

PATENT NO.         : 9,102,013 B2
APPLICATION NO.    : 13/693331
DATED              : August 11, 2015
INVENTOR(S)        : Ryu Kasai et al.

It is certified that error appears in the above-identified patent and that said Letters Patent is hereby corrected as shown below:

On the title page, Item (73), the Assignee's Information is incorrect. Item (73) should read:

--(73) Assignee:  Kabushiki Kaisha Kobe Seiko Sho (Kobe Steel, Ltd.), Kobe-shi, (JP)--

Signed and Sealed this
Twenty-sixth Day of January, 2016

Michelle K. Lee
*Director of the United States Patent and Trademark Office*

UNITED STATES PATENT AND TRADEMARK OFFICE
CERTIFICATE OF CORRECTION

PATENT NO. : 9,102,013 B2
APPLICATION NO. : 13/693331
DATED : August 11, 2015
INVENTOR(S) : Kasai et al.

It is certified that error appears in the above-identified patent and that said Letters Patent is hereby corrected as shown below:

This certificate supersedes the Certificate of Correction issued January 26, 2016. The certificate is vacated as only the English version of the assignee name is printed on the front page of patent when the English and non-English versions are provided for the same assignee. The Certificate of Correction issued January 26, 2016 was published in error and should not have issued.

The patent is returned to its original state to read:
    Title Page, Item (73)

(73) Assignee: Kobe Steel, Inc., Kobe-shi (JP)

Signed and Sealed this
Nineteenth Day of July, 2016

Michelle K. Lee
*Director of the United States Patent and Trademark Office*